United States Patent
Zeitz

(10) Patent No.: US 6,472,947 B1
(45) Date of Patent: Oct. 29, 2002

(54) MULTIPLE SIGNAL PATH ANTENNA CIRCUIT HAVING DIFFERENTIAL ATTENUATION BETWEEN SIGNAL PATHS

(75) Inventor: Carsten Zeitz, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/806,643

(22) PCT Filed: Sep. 29, 1999

(86) PCT No.: PCT/DE99/03131

§ 371 (c)(1),
(2), (4) Date: Jul. 3, 2001

(87) PCT Pub. No.: WO00/21215

PCT Pub. Date: Apr. 13, 2000

(30) Foreign Application Priority Data

Oct. 2, 1998 (DE) .......................... 198 45 534

(51) Int. Cl.[7] ........................... H03G 11/04; H04B 7/08
(52) U.S. Cl. ................... 333/17.1; 455/134; 455/277.1; 455/140
(58) Field of Search .................... 333/17.1; 455/133, 455/134, 135, 136, 277.1, 277.2, 140

(56) References Cited

U.S. PATENT DOCUMENTS

| | | | | |
|---|---|---|---|---|
| 3,794,941 A | * | 2/1974 | Templin .................... 333/17.1 |
| 5,369,801 A | * | 11/1994 | Smith ...................... 455/277.1 |
| 5,390,342 A | * | 2/1995 | Takayama et al. .......... 455/134 |
| 5,559,838 A | | 9/1996 | Nakagoshi .................. 375/347 |
| 5,697,075 A | | 12/1997 | Kim ........................... 455/133 |
| 5,940,452 A | * | 8/1999 | Rich .......................... 375/347 |
| 6,018,651 A | * | 1/2000 | Bruckert et al. ........... 455/277.1 |

FOREIGN PATENT DOCUMENTS

| | | | |
|---|---|---|---|
| DE | 42 04 490 | 8/1993 | ............ H04B/7/08 |
| EP | 0 274 157 | 7/1988 | ............ H04B/1/10 |

* cited by examiner

Primary Examiner—Robert Pascal
Assistant Examiner—Dean Takaoka
(74) Attorney, Agent, or Firm—Kenyon & Kenyon

(57) ABSTRACT

An antenna circuit is described which makes it possible to suppress intermodulation products. This antenna circuit includes an antenna connection device to which at least one first antenna can be connected, and the antenna connection device can be connected to an output of the antenna circuit over at least two signal paths. An antenna signal can be transmitted over each signal path. Transmission of a second antenna signal over a second signal path is attenuated by a predetermined attenuation value in comparison with a transmission of a first antenna signal over a first signal path. An analyzer unit is provided to determine the level of a weighting signal which is derived from an antenna signal transmitted to the output of the antenna circuit. An operating device is provided to connect only the first signal path to the output of the antenna circuit when the detected level is below a first predetermined level. The operating device connects only the second signal path to the output of the antenna circuit when the detected level is above the first predetermined level.

16 Claims, 3 Drawing Sheets

MULTIPLE SIGNAL PATH ANTENNA CIRCUIT HAVING DIFFERENTIAL ATTENUATION BETWEEN SIGNAL PATHS

FIELD OF THE INVENTION

The present invention relates to an antenna circuit.

BACKGROUND INFORMATION

There are known diversity antenna circuits to which multiple antennas can be attached and over which a signal path can be connected to an output of a corresponding antenna circuit, with one antenna signal being transmittable on each signal path. If interference in the reception signal is detected with such a diversity antenna circuit, the signal is switched from one antenna to the next.

U.S. Pat. No. 5,697,075 describes a diversity antenna arrangement for a GPS (global positioning system) where an antenna having better reception sensitivity can be selected from among several antennas. At least two antennas are provided here. Comparison means are provided, which compare a direct component that has been amplified and output from the respective signal path of the reception antennas with a predetermined direct voltage. Then one of the two antennas is selected as a function of this comparison.

U.S. Pat. No. 5,559,838 also describes a diversity receiver including a plurality of receivers, each of which receives a plurality of signals and includes a detector that selects and outputs a desired signal from the received signals. A level comparator compares the signal levels of the desired signals supplied by the detectors. The desired signal having the highest signal level is determined in this way. This signal is then selected and demodulated.

SUMMARY OF THE INVENTION

The antenna circuit according to the present invention has the advantage over the related art that transmission of a second antenna signal over a second signal path is attenuated by a predetermined attenuation value in comparison with transmission of a first antenna signal over a first signal path. An analyzer unit is provided to determine the level of a weighting signal which is derived from an antenna signal transmitted to the output of the antenna circuit; an operating device is provided to connect only the first signal path to the output of the antenna circuit when the level determined is below a first predetermined level, and this operating device connects only the second signal path to the output of the antenna circuit when the level determined is above the first predetermined level. In this way, it is possible to improve reception of antenna signals in regions having very strong transmitters. Reception of antenna signals is often greatly impaired in regions having very strong transmitters. High reception levels lead to intermodulation in semiconductor components of an antenna amplifier and downstream receiver stages and thus interfere with the received antenna signals. However, as a result of switching between different signal paths to connect the output of the antenna circuit to the antenna connection device, the level at the output of the antenna circuit is limited to a level that does not result in the intermodulation described above.

It is especially advantageous that in the case when the second signal path is connected to the output of the antenna circuit, the operating device disconnects the second signal path from the output of the antenna circuit and connects the first signal path to the output of the antenna circuit when the analyzer unit detects a level below a second predetermined level, the second predetermined level being lower than the first predetermined level by more than the attenuation value. This results in a hysteresis for switching between the two signal paths, thus preventing excessively frequent switching.

It is advantageous that the operating device includes at least one, preferably mechanical, relay by way of which either the first signal path or the second signal path can be connected to the output of the antenna circuit. This does not result in any intermodulation in the received antenna signal.

Another advantage is obtained if the operating device includes at least one first switch and one second switch, the first signal path being connectable to the output of the antenna circuit over the first switch, and the second signal path being connectable to the output of the antenna circuit over the second switch, and the first switch or the second switch being designed as an electronic switch, preferably a PIN diode, and being arranged between the matching network and the output of the antenna circuit. This saves on costs and space for implementation of the operating device, especially in reception of HF antenna signals. Positioning the respective electronic switch between the matching network and the output of the antenna circuit guarantees good isolation between the signal paths to be switched, because each electronic switch is thus used at a point in the antenna circuit adapted to the impedance of the entire reception system.

Another advantage is obtained when an attenuation element is connected upstream from at least the first switch. This prevents excessively high levels from occurring at the respective switch, which can result in interfering intermodulation when the respective switch is designed as an electronic switch. The upstream attenuation element can be implemented in an especially simple manner by a multi-stage design of the respective switch, in particular in the form of two successive PIN diodes. At the first attenuation stage or PIN diode, interfering intermodulation products can be allowed to occur at a suitably high level of the received antenna signal, because they can then be switched off by the second switch stage or the downstream PIN diode. At the same time, the attenuated signal path is then also connected to the output of the antenna circuit.

An especially simple implementation of the antenna circuit is obtained when a second antenna can be connected to the antenna connection device, with the second antenna supplying an antenna voltage which is lower than that supplied by the first antenna by the predetermined attenuation value or having a lower reception sensitivity than the first antenna by the predetermined attenuation value, and the first antenna being connectable to the output of the antenna circuit over the first signal path and the second antenna being connectable to the output of the antenna circuit over the second signal path.

Antennas and matching networks can be eliminated by diverting the second signal path from the first signal path and by having the attenuation on the second signal path be higher than that on the first signal path by the predetermined attenuation value.

The second signal path can be diverted easily from the first signal path using a transformer or via a resistor network.

It is especially advantageous that the weighting signal corresponds to an antenna signal transmitted to the output of the antenna circuit. The weighting signal can be formed especially easily in this way.

It is advantageous if the weighting signal corresponds to a control signal which is derived from a received antenna signal to a radio receiver connected to the output of the antenna circuit, the level of the control signal increasing with intermodulation interference in the antenna signal. In this way, switching between the signal paths can take place only as a function of intermodulation occurring in the radio receiver, so that unnecessary switching is prevented.

DETAILED DESCRIPTION

Figure 1:
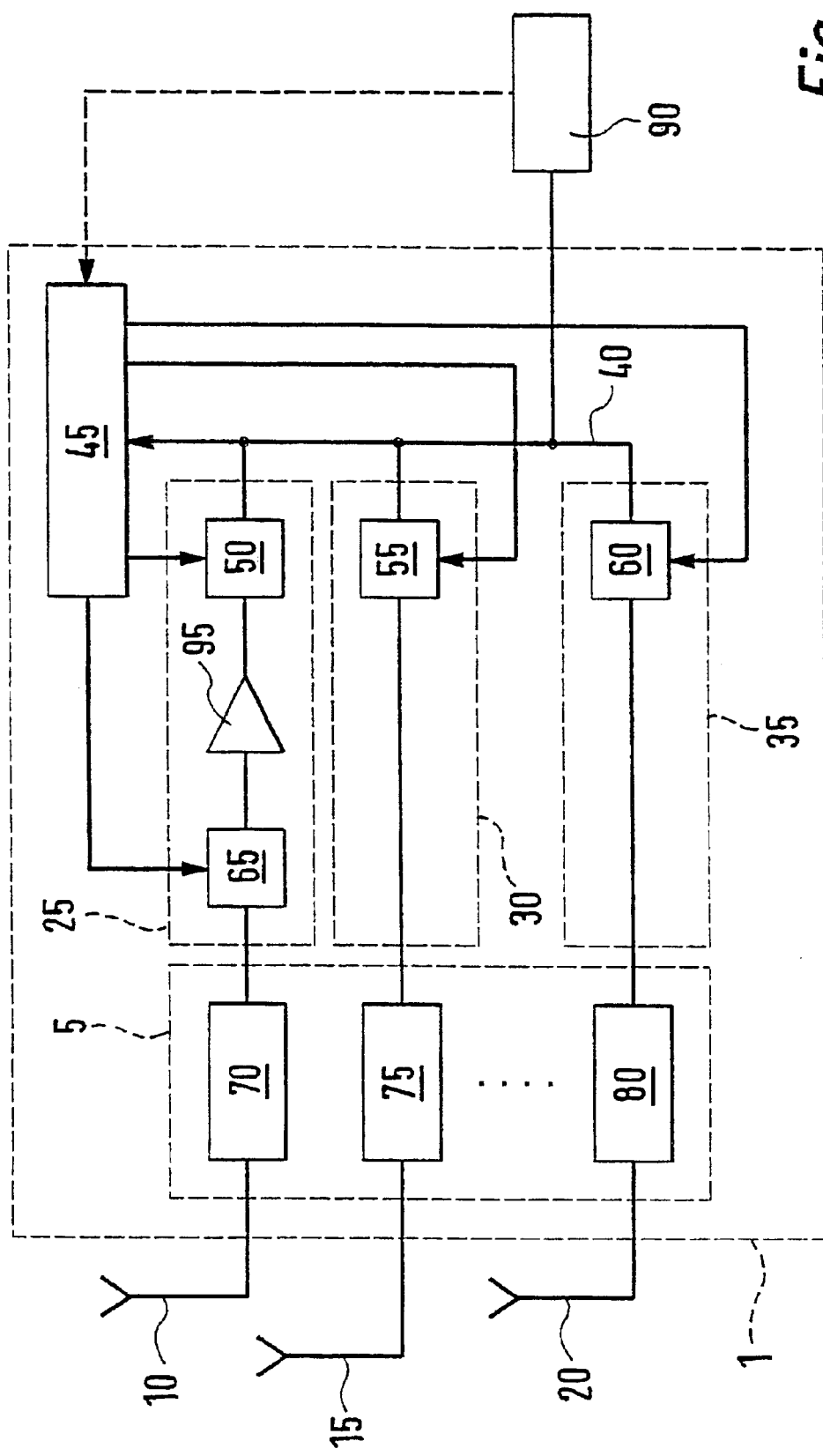
FIG. 1 shows a block diagram of an antenna circuit using multiple antennas.

FIG. 1 shows an antenna circuit 1, such as can be provided in a motor vehicle, for example, for connecting at least one antenna on the one hand and a car radio on the other hand. According to FIG. 1, a first antenna 10 is connected to antenna circuit 1 over a first matching network 70; a second antenna 15 is connected over a second matching network 75 and a third antenna 20 is connected over a third matching network 80. The points illustrated in FIG. 1 between the second matching network 75 and third matching network 80 indicate that antenna circuit 1 could also be used for connecting more than three antennas, each over a corresponding matching network. On the other hand, antenna circuit 1 could also be used only for connecting the first antenna 10 and second antenna 15.

Matching networks 70, 75, 80 form an antenna connection device, connectable over three signal paths 25, 30, 35 to one output 40 of antenna circuit 1. The first matching network 70 can be connected to output 40 over a fourth switch 65, an amplifier 95 and a first switch 50. Second matching network 75 can be connected to output 40 over a second switch 55. Third matching network 80 can be connected to output 40 over a third switch 60. The first signal path 25 includes fourth switch 65, amplifier 95 and first switch 50. The second signal path 30 includes second switch 55, and the third signal path 35 includes third switch 60. Output 40 is sent to an analyzer unit 45 which controls all switches 50, 55, 60, 65. In addition, a radio receiver 90, in particular a car radio, is also connected to output 40.

The impedance of whichever antenna 10, 15, 20 is connected to matching network 70, 75, 80 is matched by matching networks 70, 75, 80 to that of the reception system, which is designed as a radio receiver 90.

Figure 2:
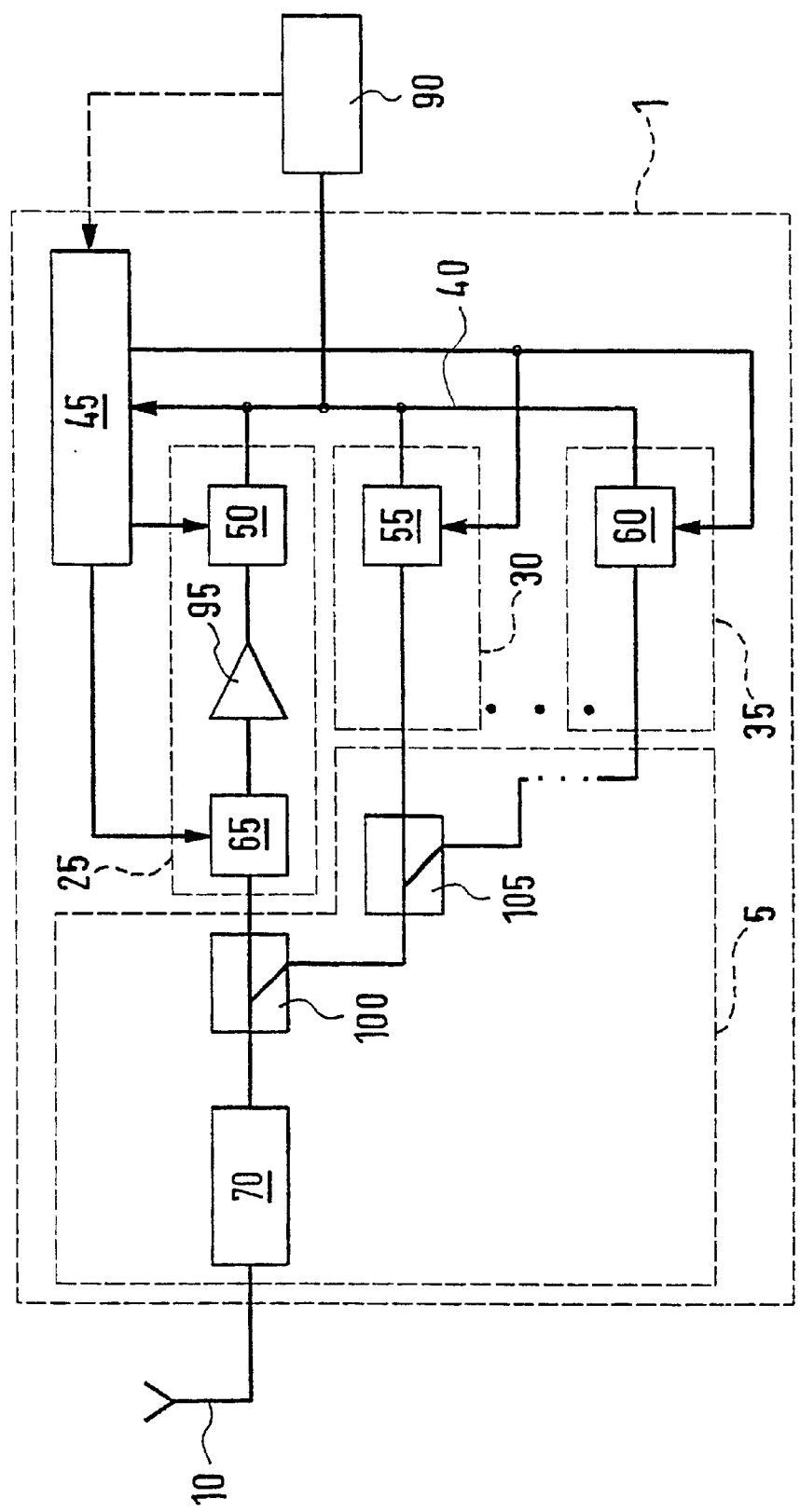
FIG. 2 shows a block diagram of an antenna circuit using a single antenna with the signal paths diverted using a transformer.

FIG. 2 illustrates another embodiment of antenna circuit 1 according to the present invention in the form of a block diagram. In FIG. 2, the same reference numbers are used to denote the same elements as in FIG. 1. The design of antenna circuit 1 according to FIG. 2 corresponds to the design of antenna circuit 1 according to FIG. 1, but antenna connection device 5 has a different design which includes only the connection of the first antenna 10. Antenna connection device 5 according to FIG. 2 includes a first fork transformer 100 and a second fork transformer 105. First antenna 10 is then connected to fourth switch 65 of first signal path 25 over first matching network 70 and first fork transformer 100. An antenna signal received by the first antenna 10 is transmitted as a first antenna signal with essentially no loss to the fourth switch 65 on first signal path 25 over first matching network 70 and first fork transformer 100. On the other hand, a second antenna signal with a predetermined attenuation of 15 dB, for example, is diverted from the first antenna signal by first fork transformer 100 and is then transmitted with essentially no loss to second switch 55 on second signal path 30 over second fork transformer 105. Then a third antenna signal again having a predetermined attenuation of 15 dB, for example, is diverted from the second antenna signal by second fork transformer 105 and sent to third switch 60 on third signal path 35. The points between second signal path 30 and third signal path 35 in FIG. 2 indicate that antenna connection device 5 can also be connected to output 40 over more than three signal paths, with the antenna signals each being supplied attenuated to the corresponding signal paths over one fork transformer, as illustrated in FIG. 2.

Figure 3:
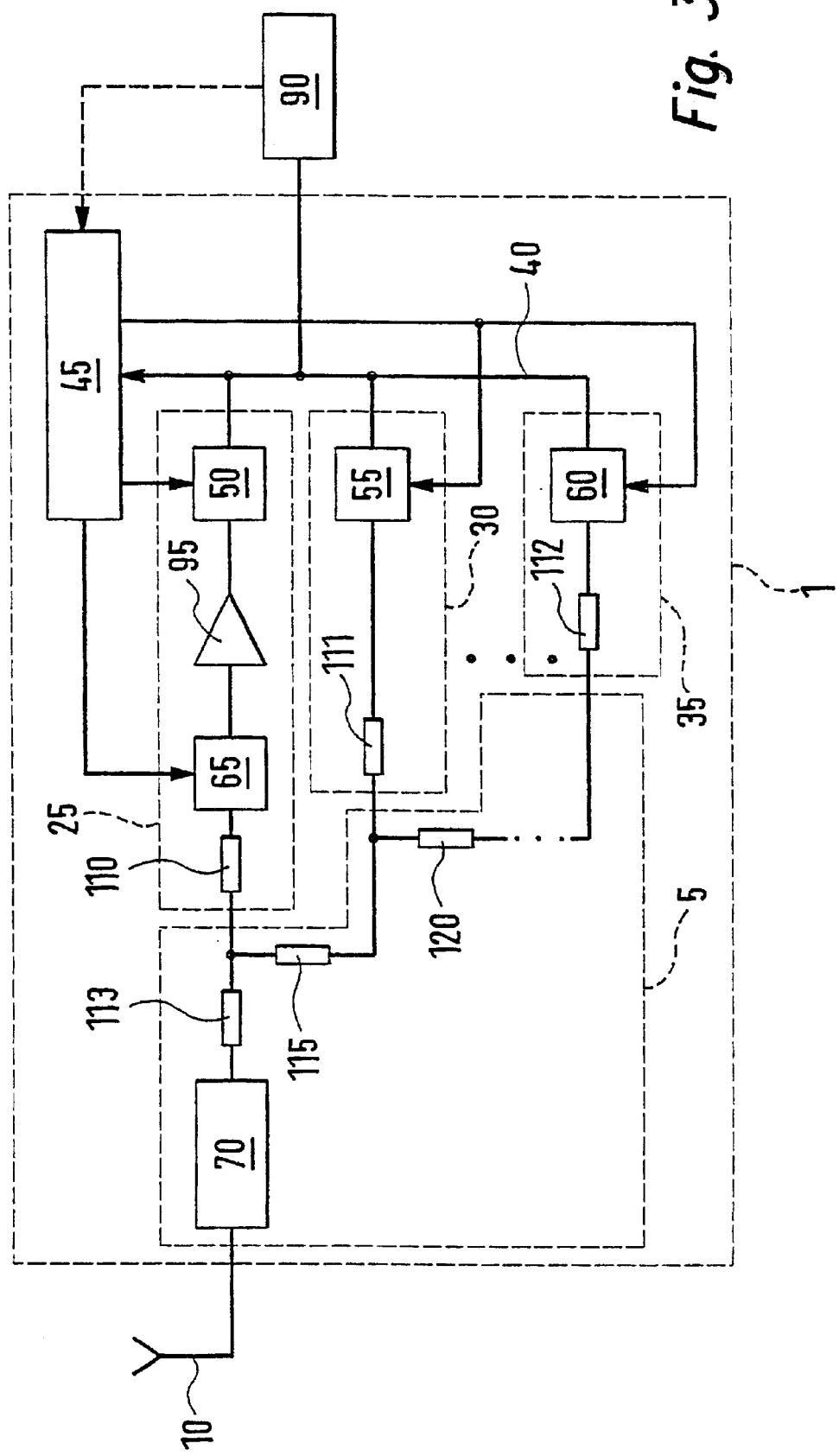
FIG. 3 shows a block diagram of an antenna circuit using a single antenna with the signal paths diverted over resistance networks.

FIG. 3 shows another embodiment of an antenna circuit 1 according to the present invention, using the same reference numbers to denote the same elements as in FIGS. 1 and 2. The design of antenna circuit 1 according to FIG. 3 is the same as the design of antenna circuit 1 in FIGS. 1 and 2, with the difference that each signal path 25, 30, 35 also includes a series resistor 110, 111, 112, and antenna connection device 5 also has a different design. According to FIG. 3, only first antenna 10 is connected to antenna connection device 5. Antenna connection device 5 here includes branch resistors 113, 115, 120 across which the individual signal paths 25, 30, 35 are connected to antenna connection device 5. Thus, first antenna 10 is connected to first signal path 25, i.e., to a first series resistor 110 of first signal path 25 over first matching network 70 and a first branch resistor 113. A second branch resistor 115 which is connected between the first branch resistor 113 and first series resistor 110 is in turn connected to a second series resistor 111 of second signal path 30. A third branch resistor 120 which is connected between second branch resistor 115 and second series resistor 111 is in turn connected to a third series resistor 112 of third signal path 35. The points between second signal path 30 and third signal path 35 in FIG. 3 also indicate that additional signal paths can be branched off similarly over branch resistors.

In the embodiments according to FIGS. 2 and 3, however, it is also possible to have only first signal path 25 and second signal path 30.

In the embodiment illustrated in FIG. 1, the reception sensitivity of second antenna 15 is lower than that of first antenna 10 by a predetermined attenuation value, and the reception sensitivity of third antenna 20 is lower than that of second antenna 15 by a predetermined attenuation value.

The dimensioning of branch resistors 113, 115, 120 according to FIG. 3 is selected so that the first antenna signal at the output of matching network 70 is transferred to first signal path 25 essentially unattenuated over first branch resistor 113 and is sent to second signal path 30 as the second antenna signal which has been attenuated by a predetermined attenuation value over second branch resistor 115. Accordingly, a third antenna signal which has been attenuated by a predetermined attenuation value is diverted over third branch resistor 120 and applied to third signal path 35.

According to FIG. 3, a value of 5Ω, for example, can be selected for first branch resistor 113 and each of series resistors 110, 111, 112, and a value of 200Ω can be selected for second branch resistor 115 and third branch resistor 120.

In the embodiments of antenna circuit 1 according to FIGS. 1, 2 and 3, the first antenna signal is transmitted on first signal path 25 to output 40 with essentially no attenuation. The second antenna signal is transmitted to output 40 on second signal path 30, so that it is attenuated by the predetermined attenuation value in comparison with the first antenna signal. The third antenna signal transmitted on third signal path 35 is attenuated by the predetermined attenuation value in comparison with the second antenna signal. Antenna signals can also be transmitted on signal paths 25, 30, 35 with different mutual attenuation values.

The first antenna signal in first signal path 25 should be transmitted over output 40 to radio receiver 90 with preferably no attenuation, so that an amplifier 95 in the first signal path 25 may optionally be used to increase the sensitivity of the reception system formed by antenna circuit 1 and radio receiver 90.

Switches 50, 55, 60, 65 may each be designed as a PIN diode. The first switch 50 and fourth switch 65 are first conducting and the second switch 55 and third switch 60 are non-conducting. Thus, at first only the first antenna signal is transmitted over first signal path 25 to output 40 and from there to radio receiver 90. Analyzer unit 45 determines the level of the signal which is transmitted to output 40 and used as the weighting signal. As long as the level determined by analyzer unit 45 at output 40 is below a first predetermined level, first switch 50 and fourth switch 65 remain conducting, and second switch 55 and third switch 60 remain non-conducting, so that only the first antenna signal is transmitted to output 40 over first signal path 25. If the level at output 40 exceeds the first predetermined level, then analyzer unit 45 causes first switch 50 and fourth switch 65 to be non-conducting and second switch 55 to be conducting, so that only the second antenna signal is transmitted to output 40 over the second signal path 30. In this way, the level at output 40 can be reduced to suppress intermodulation, especially in regions having very strong transmitters. If attenuation in the second signal path is not sufficient, second switch 55 can also be non-conducting accordingly and the third switch 60 can be conducting, so that only the third antenna signal goes over third signal path 35 to output 40 with an increased attenuation accordingly.

For the case when only the second antenna signal is transmitted to output 40 over the second signal path 30, i.e., first switch 50, third switch 60 and fourth switch 65 are non-conducting and the second switch 55 is conducting, and analyzer unit 45 detects that the level at output 40 has dropped below a second predetermined level which is lower than the first predetermined level, then analyzer unit 45 causes the second switch 55 to be non-conducting and the first switch 50 and the fourth switch 65 to be conducting, so that only the first antenna signal is transmitted to output 40 over the first signal path 25. The third switch 60 remains non-conducting here. A hysteresis for switching between the individual signal paths is achieved through the choice of the second predetermined level at an appropriate interval, i.e., below the first predetermined level by more than the attenuation value, preventing too frequent switching between the antenna signals to be transmitted to radio receiver 90 and thus preventing impairment of their acoustic reproduction on radio receiver 90.

According to the embodiments described here, switches 50, 55, 60, 65 are designed as controllable electronic switches, each in the form of a PIN diode. However, other controllable electronic switches such as transistors may also be used. Since switches 50, 55, 60, 65 which are designed as electronic switches are each arranged at a location in antenna circuit 1 which matches the system impedance of radio receiver 90, guaranteeing good isolation between signal paths 25, 30, 35 to be switched. However, switches 50, 55, 60, 65 which are designed as PIN diodes or transistors have the disadvantage that they can also generate intermodulation in particular. Therefore, they are each arranged at a location in antenna circuit 1 where no high levels can occur. Therefore, additional attenuation occurs in first signal path 25, which should transmit the first antenna signal received by first antenna 10 to output 40 with as little attenuation as possible, as described above, for the case when first switch 50, which is designed as a PIN diode, is non-conducting because the level of the first antenna signal is too high. The additional attenuation in first signal path 25 which is provided for this case prevents intermodulation products from passing over non-conducting first switch 50 to radio receiver 90. If first switch 50 is conducting with a suitably low level of the first antenna signal, then the additional attenuation in first signal path 25 is not necessary, because the first antenna signal should have as little attenuation as possible. Therefore, the use of fourth switch 65 in first signal path 25 is suggested, and fourth switch 65 may be designed as a PIN diode, as described above, and can perform the function of the additional attenuation in first signal path 25 in the case when first switch 50 is non-conducting. If first switch 50 is conducting, fourth switch 65 may also be conducting, and the additional attenuation in the first signal path 25 may be removed. Since the first antenna signal is transmitted to output 40 only when the level is low enough, essentially no intermodulation products are formed when the first switch 50 and fourth switch 65 are conducting. However, if first switch 50 and fourth switch 65 are non-conducting, they act as a two-stage switch, which attenuates the level of the first antenna signal in its first stage at fourth switch 65, so that intermodulation products are formed, and in its second stage at first switch 50, the attenuated first antenna signal and the resulting intermodulation products are completely suppressed. To prevent the development of intermodulation products at second switch 55 and/or at third switch 60, second switch 55 and/or third switch 60 may also be designed as multi-stage switches in the manner described above.

Switches 50, 55, 60, 65 form an operating device which as an alternative may also be implemented in the form of at least one, preferably mechanical, relay over which first signal path 25, second signal path 30 or third signal path 35 can be connected to output 40 of antenna circuit 1. The minimum of one relay is also controlled by analyzer unit 45, so that either first signal path 25, second signal path 30 or third signal path 35 is connected to output 40 as a function of the level determined at output 40 in the manner described here. The relay should be arranged upstream from the first active component of antenna circuit 1 or radio receiver 90 which can produce intermodulation products, so that an attenuated antenna signal is sent to even this first active component and thus intermodulation is prevented at this first active component.

The level at output 40 can be analyzed by analyzer unit 45 as a broad-band signal by analyzing the weighting signal over a relatively large range of the reception spectrum. However, it is optionally also possible to use a control signal or a control voltage from radio receiver 90 as the weighting signal to control switches 50, 55, 60, 65 over analyzer unit 45 in the manner described here, with this control voltage weighting high-level signal interference (due to intermodulation caused by strong transmitters in the reception region) in the signal sent to radio receiver 90. The control voltage is then determined in radio receiver 90 and is sent to analyzer unit 45 according to the dotted line diagrams in FIGS. 1, 2 and 3, where the level of the control voltage increases with the received intermodulation products. This variant is appropriate in particular when a control voltage derived from detection of such high-level signal interference in the signal sent to radio receiver 90 is available in radio receiver 90. This control voltage can then be sent to analyzer unit 45 to control switches 50, 55, 60, 65.

Attenuation of the antenna signals on second signal path 30 and third signal path 35 due to the use of fork transformers 100, 105 according to FIG. 2, branch resistors 113, 115, 120 according to FIG. 3 or due to the use of multiple antennas 10, 15, 20 with different reception sensitivities is purely passive, so that no intermodulation products are formed.

In particular in the embodiment according to FIG. 2, fork transformers 100, 105 can be designed with dimensions such that their throughput attenuation amounts to a maximum of 1.5 dB which is thus comparatively low, and its branch attenuation amounts to 15 dB or 20 dB which is thus comparatively high. First fork transformer 100 thus transmits the first antenna signal with essentially no attenuation on first signal path 25, and second fork transformer 105 transmits the second antenna signal with essentially no attenuation on second signal path 30, where the second antenna signal is attenuated by 15 dB or 20 dB in comparison with the first antenna signal due to the transformer branch from the first antenna signal over first fork transformer 100. Accordingly, the third antenna signal, which is diverted from the second antenna signal by transformation over second fork transformer 105 and is sent on third signal path 35 is also attenuated by 15 dB or 20 dB in comparison with the second antenna signal.

The antenna signals in signal paths 25, 30, 35 according to FIG. 3 are attenuated with the help of branch resistors 113, 115, 120 according to the voltage divider principle.

In the embodiment according to FIG. 1, attenuation of the antenna signals on signal paths 25, 30, 35 is achieved through the difference in reception sensitivity of antennas 10, 15, 20. Antennas 10, 15, 20 may be, for example, disk-type antennas and/or telescoping antennas and/or short-rod antennas of a motor vehicle.

In antenna circuit 1 according to FIG. 1, the antenna signals on individual signal paths 25, 30, 35 are not formed by derivation from one another in contrast with the embodiments according to FIGS. 2 and 3, but instead each signal is sent over a separate antenna 10, 15, 20 to the corresponding signal path 25, 30, 35.

What is claimed is:

1. An antenna circuit, comprising:
   at least two signal paths;
   an antenna connection device connected to an output via the at least two signal paths and to which at least one first antenna is capable of being attached, wherein:
   a second antenna signal that has been received and then conveyed via a second one of the at least two signal paths is attenuated by a predetermined attenuation value in comparison with a first antenna signal that has been received and then conveyed via a first one of the at least two signal paths;
   an analyzer unit for determining a level of a weighting signal derived from magnitudes of at least one of the first antenna signal and the second antenna signal provided to the output; and
   an operating device for connecting only the first one of the at least two signal paths to the output when the determined level of the weighting signal is below a first predetermined level, and for connecting only the second one of the at least two signal paths to the output when the determined level of the weighting signal is above the first predetermined level.

2. The antenna circuit according to claim 1, wherein:
   when the second one of the at least two signal paths is connected to the output, the operating device disconnects the second one of the at least two signal paths from the output and connects the first one of the at least two signal paths to the output when the analyzer unit detects the level of the weighting signal as being below a second predetermined level, the second predetermined level being lower than the first predetermined level by more than the predetermined attenuation value.

3. The antenna circuit according to claim 1, wherein:
   the operating device includes at least one relay over which one of the at least two signal paths is capable of being connected to the output.

4. The antenna circuit according to claim 3, wherein:
   the at least one relay includes at least one mechanical relay.

5. The antenna circuit according to claim 1, wherein:
   the second one of the at least two signal paths is diverted from the first one of the at least two signal paths, and
   the second one of the at least two signal paths has an attenuation that is higher by the predetermined attenuation value in comparison with that of the first one of the at least two signal paths.

6. The antenna circuit according to claim 5, further comprising:
   a resistance network over which the second one of the at least two signal paths is diverted from the first one of the at least two signal paths.

7. The antenna circuit according to claim 1, wherein:
   the weighting signal corresponds to the at least one of the first antenna signal and the second antenna signal transmitted to the output.

8. The antenna circuit according to claim 1, wherein:
   the operating device includes at least one first switch and at least one second switch,
   the first one of the at least two signal paths is connectable to the output via the at least one first switch, and
   the second one of the at least two signal paths is connectable to the output via the at least one second switch.

9. The antenna circuit according to claim 8, further comprising:
   a matching network, wherein:
   one of the at least one first switch and the at least one second switch includes an electronic switch and is arranged between the matching network and the output.

10. The antenna circuit according to claim 9, wherein:
    the electronic switch includes a PIN diode.

11. The antenna circuit according to claim 8, further comprising:
    an attenuation element connected upstream from at least the at least one first switch.

12. The antenna circuit according to claim 8, wherein:
    one of the at least one first switch and the at least one second switch includes multiple stages.

13. The antenna circuit according to claim 12, wherein:
    the multiple stages include two successive PIN diodes.

14. The antenna circuit according to claim 1, wherein:
    a second antenna is capable of being connected to the antenna connection device, the second antenna includes a reception sensitivity that is lower than that of the first antenna by the predetermined attenuation value, the first antenna is connectable to the output over the first one of the at least two signal paths, and the second antenna is connectable to the output over the second one of the at least two signal paths.

15. An antenna circuit, comprising:

at least two signal paths;

an antenna connection device connected to an output via the at least two signal paths and to which at least one first antenna is capable of being attached, wherein:

a transmission of a second antenna signal via a second one of the at least two signal paths is attenuated by a predetermined attenuation value in comparison with a transmission of a first antenna signal via a first one of the at least two signal paths;

an analyzer unit for determining a level of a weighting signal derived from at least one of the first antenna signal and the second antenna signal transmitted to the output;

an operating device for connecting only the first one of the at least two signal paths to the output when the determined level of the weighting signal is below a first predetermined level, and for connecting only the second one of the at least two signal paths to the output when the determined level of the weighting signal is above the first predetermined level, wherein:

the second one of the at least two signal paths is diverted from the first one of the at least two signal paths, and the second one of the at least two signal paths has an attenuation that is higher by the predetermined attenuation value in comparison with that of the first one of the at least two signal paths; and a transformer, wherein:

the second one of the at least two signal paths is diverted from the first one of the at least two signal paths in accordance with an operation of the transformer.

16. An antenna circuit, comprising:

at least two signal paths;

an antenna connection device connected to an output via the at least two signal paths and to which at least one first antenna is capable of being attached, wherein:

a transmission of a second antenna signal via a second one of the at least two signal paths is attenuated by a predetermined attenuation value in comparison with a transmission of a first antenna signal via a first one of the at least two signal paths;

an analyzer unit for determining a level of a weighting signal derived from at least one of the first antenna signal and the second antenna signal transmitted to the output; and an operating device for connecting only the first one of the at least two signal paths to the output when the determined level of the weighting signal is below a first predetermined level, and for connecting only the second one of the at least two signal paths to the output when the determined level of the weighting signal is above the first predetermined level, wherein:

the weighting signal corresponds to a control signal derived from a received antenna signal in a radio receiver connected to the output, and a level of the control signal increases with an intermodulation interference in the received antenna signal.

* * * * *